US008373739B2

(12) United States Patent
Sampsel et al.

(10) Patent No.: US 8,373,739 B2
(45) Date of Patent: Feb. 12, 2013

(54) SYSTEMS AND METHODS FOR REMOTELY COMMUNICATING WITH A PATIENT

(75) Inventors: Debi Sampsel, West Chester, OH (US); Diane Mehling, Centerville, OH (US)

(73) Assignee: Wright State University, Dayton, OH (US)

( * ) Notice: Subject to any disclaimer, the term of this patent is extended or adjusted under 35 U.S.C. 154(b) by 675 days.

(21) Appl. No.: 12/574,273

(22) Filed: Oct. 6, 2009

(65) Prior Publication Data

US 2010/0085418 A1    Apr. 8, 2010

Related U.S. Application Data

(60) Provisional application No. 61/102,953, filed on Oct. 6, 2008.

(51) Int. Cl.
*H04N 7/14* (2006.01)
(52) U.S. Cl. ............... 348/14.01; 348/14.08; 348/14.12
(58) Field of Classification Search .... 348/14.01–14.16; 715/753; 600/300; 700/245, 250, 261; 702/188; 901/2
See application file for complete search history.

(56) References Cited

U.S. PATENT DOCUMENTS

| | | | |
|---|---|---|---|
| 5,553,609 A | 9/1996 | Chen et al. | |
| 7,129,970 B2* | 10/2006 | James et al. | 348/14.01 |
| 7,158,860 B2 | 1/2007 | Wang et al. | |
| 7,158,861 B2 | 1/2007 | Wang et al. | |
| 7,171,286 B2 | 1/2007 | Wang et al. | |
| 7,218,992 B2 | 5/2007 | Wang et al. | |
| 7,289,883 B2* | 10/2007 | Wang et al. | 700/245 |
| 2002/0186243 A1* | 12/2002 | Ellis et al. | 345/753 |
| 2007/0070204 A1* | 3/2007 | Mentzer | 348/207.99 |
| 2007/0097211 A1* | 5/2007 | Washington | 348/135 |
| 2008/0095079 A1* | 4/2008 | Barkley et al. | 370/260 |
| 2009/0093688 A1* | 4/2009 | Mathur | 600/300 |

* cited by examiner

*Primary Examiner* — Melur Ramakrishnaiah
(74) *Attorney, Agent, or Firm* — Dinsmore & Shohl LLP (57) ABSTRACT

A system and methods to permit a health care provider and a patient to remotely communicate information corresponding to the patient's medical condition with each other, both visually and audibly, via communication link in real time. The system may comprise a first and second interface units each comprising a camera, a microphone, a display, and a speaker. The camera and microphone of the first interface unit may permit real-time video and audio, respectively, to be transferred to the display and speaker of the second unit. Likewise, the camera and microphone of the second interface unit may permit real-time video and audio, respectively, to be transferred to the display and speaker of the first unit.

16 Claims, 4 Drawing Sheets

SYSTEMS AND METHODS FOR REMOTELY COMMUNICATING WITH A PATIENT

This application claims the benefit of U.S. Provisional Application No. 61/102,953, filed Oct. 6, 2008.

TECHNICAL FIELD

The subject matter described herein relates to the field of medicine and, more particularly, to systems and methods for remotely communicating with a patient.

BACKGROUND

As background, there is a growing need to be able to provide remote health care to patients having a variety of medical conditions. To minimize costs, it is desirable to be able to provide home care for many such patients. Such home care requires periodic visits by health care providers such as nurses or health care aides. Due to financial and/or staffing issues, doctors and senior or supervisory nursing personnel cannot be used on a regular basis to make home visits. It would be desirable to provide a system which permits remote monitoring and interaction with patients from a central location in a way that permits doctors and senior nursing staff to actively participate in the home care of patients.

Remote robotic systems have been used in the medical field to permit remotely-located doctors to interact with patients and staff in a hospital environment. See, e.g., Wang et al., U.S. Pat. No. 7,218,992. Such remote robotic systems, which comprise a mobile robot equipped with a camera and two-way communications capabilities, provide the remotely-located physician with the ability to interact within a hospital environment as if the physician were actually present.

Hospitals have justified the expense of such remote robotic systems because they permit physicians to see and visit (electronically) many more patients than otherwise would be possible, to interact with on-site hospital staff, and to provide expertise as needed. However, such remote robotic systems are expensive and the robots cannot routinely travel easily outside of a hospital environment. Even though the '992 patent describes the placement of a remote robotic system in a patient's home, such placement and use to monitor patients in their homes may be prohibitively expensive.

Accordingly, there remains a need in the medical field for a less expensive means of providing high quality home health care to patients in need of medical attention.

SUMMARY

This need may be met by a remote communication system which permits a health care provider to remotely communicate with a patient. The communication system may comprise two or more interface units which facilitate the real-time communication of video and audio between the health care provider and the patient. In one embodiment, one of the interface units may be a robot so as to create a remote robotic system. A remote robotic system may be used in a novel manner to provide remote monitoring of and interaction with home health care patients. Additionally, the need for doctors, specialists, and senior nursing personnel to be able to monitor and interact with larger numbers of patients in their homes is also met.

In accordance with another embodiment, a method of using a remote robotic system is provided in which a nurse or other health care provider visits a patient in his home or other remote location to provide patient care. The nurse is provided with a portable or laptop computer which is equipped with a camera, microphone, and wired or wireless broadband Internet communications capability. The nurse connects the portable computer to the remote robot which may be located in a hospital or other central location. In this manner, a senior or supervisory hospital staff person, doctor, or other specialist can then interact with the remotely-located nurse and patient to provide any needed expertise.

Alternatively, the patient may be provided with or supply his own computer, as an increasing number of homes have both computers and broadband Internet capabilities. Depending on the health and level of sophistication of the patient, the patient himself may connect with the centrally-located, remote robotic system and health care provider to supply remote monitoring of and interaction with such a patient without the need for travel by the health care provider.

Using the two-way communications capability of the remote robot and laptop, the home care health care provider or nurse may manipulate the camera and microphone so that centrally-located personnel may observe the patient and any physical details such as wounds, interact with and ask questions of the patient, observe vital signs monitors associated with the patient, and the like. In a preferred embodiment, the portable or remote computer's camera is equipped with pan and zoom capability to provide centrally-located personnel with the ability to view needed details of the patient, vital signs monitors, patient's charts, or medication. Alternatively, the remotely-located home-care worker or nurse can manually manipulate the camera-equipped portable or remote computer so that the centrally located personnel can view the entire scene as needed.

Accordingly, it is a feature of the present invention to use a remote robotic system in a novel manner to provide remote monitoring of and interaction with home health care patients. Other features and advantages of the present invention will be apparent from the following detailed description, accompanying drawings, and appended claims.

In yet another embodiment, a system for remote communication between a health care provider and a patient comprises a first interface unit connectable to a communication link, and a second interface unit connectable to the communication link, wherein: the communication link is operable to transmit real-time video and audio between the first and second interface units; and the first and second interface units each comprise a camera, a microphone, a display, and a speaker such that upon the transmission of real-time video from the camera of one of the first and second interface units to the display of the other of the first and second interface units, and the transmission of real-time audio from the microphone of one of the first and second interface units to the speaker of the other of the first and second interface units, real-time remote visual and audio communication is established between the health care provider, when disposed at one of the first and second interface units, and the patient, when disposed at the other of the first and second interface units.

In another embodiment, a method for remote communication between a health care provider and a patient comprises: establishing a communication link between a first interface unit and a second interface unit, wherein the first and second interface units each comprise a camera, a microphone, a display, and a speaker such that, upon establishment of the communication link, real-time video from the camera of one of first and second interface units is transmitted to the display of the other of the first and second interface units, and real-time audio from the microphone of one of the first and second interface units is transmitted to the speaker of the other of the first and second interface units; disposing one of the first and second interface units at the health care provider; disposing the other of the first and second interface units at the patient; communicating information corresponding to the patient's medical condition, both visually and audibly, between the health care provider and the patient via the communication link in real time.

In still another embodiment, a method for remote communication between a health care provider and a patient comprises: establishing a communication link between a robot and an interface unit, wherein the robot and interface unit each comprise a camera, a microphone, a display, and a speaker such that, upon establishment of the communication link, real-time video from the camera of one of the robot and the interface unit is transmitted to the display of the other of the robot and interface unit, and real-time audio from the microphone of one of the robot and interface unit is transmitted to the speaker of the other of the robot and interface unit; determining whether to operate in a first operating mode or a second operating mode such that when operating in the first operating mode, moving the robot to the patient and disposing the health care provider at the interface unit, and when operating in the second operating mode, disposing the patient at the robot and disposing the health care provider at the interface unit; and communicating information corresponding to the patient's medical condition, both visually and audibly, between the health care provider and the patient via the communication link in real time.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

The embodiments described herein generally related to systems and methods for permitting a health care provider to remotely communicate with a patient. Health care providers may include, but are not limited to, doctors, specialists, physicians, nurses, occupational therapists, and physical therapists. Other types of health care providers are contemplated as well. The patient may include an individual patient or an agent acting on behalf of the patient, such as an in-house provider. The in-house provider may facilitate the communication between the health care provider and the patient when, as an example, the patient is in a weakened state or is otherwise unable to fully communicate. As used herein, communication with the patient includes communication with an agent acting on behalf of the patient. When remotely communicating, the health care provider and patient may be in different locations such that they are not in the physical presence of each other. For example, they may be in different rooms of the same building or in different buildings. In the latter example, they may be separated by a few miles or by hundreds of miles.

Figure 1:
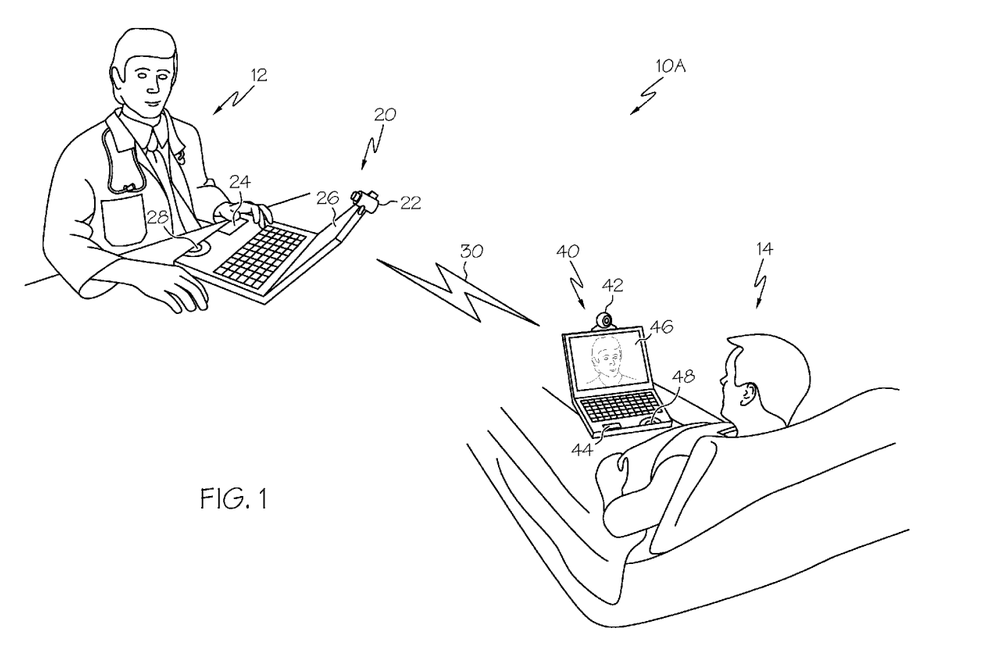
FIG. 1 depicts a system for remotely communicating with a patient according to one or more embodiments shown and described herein.

FIG. 1 depicts one embodiment of a system 10A which permits a health care provider 12 to remotely communicate with a patient 14. The system 10A may comprise a first interface unit 20, a communication link 30, and a second interface unit 40. The first interface unit 20 may comprise a camera 22, a microphone, 24, a display 26, and a speaker 28. The second interface unit 40 may also comprise a camera 42, a microphone, 44, a display 46, and a speaker 48. The communication link 30 may be operable to transmit real-time video from the camera 22 of the first interface unit 20 to the display 46 of the second interface unit 40. The communication link 30 may also be operable to transmit real-time audio from the microphone 24 of the first interface unit 20 to the speaker 48 of the second interface unit 40. Likewise, the communication link 30 may be operable to transmit real-time video from the camera 42 of the second interface unit 40 to the display 26 of the first interface unit 20. The communication link 30 may also be operable to transmit real-time audio from the microphone 44 of the second interface unit 40 to the speaker 28 of the first interface unit 20. In this fashion, the system 10A permits the health care provider 12, when disposed at the first interface unit 20 (as depicted in FIG. 1), and the patient 14, when disposed at the second interface unit 40 (as depicted in FIG. 1), to remotely communicate information corresponding to the patient's medical condition with each other, both visually and audibly, via the communication link in real time.

Similarly, the system 10A may permit the health care provider 12, when disposed at the second interface unit 40, and the patient 14, when disposed at the first interface unit 20, to remotely communicate information corresponding to the patient's medical condition with each other, both visually and audibly, via the communication link in real time.

Furthermore, the system 10A may further permit a health care teacher, when disposed at one of the first and second interface units, and one or more students, when disposed at the other of the first and second interface units, to remotely communicate educational information with each other, both visually and audibly, via the communication link in real time. For example, a nursing instructor may be disposed at the first interface unit, and one or more students may be disposed at the second interface unit. The system 10A may permit the nursing instructor to present educational information to the students via the communication link 30.

The first interface unit 20 or second interface unit 40 may be a digital computing device comprising a central processing unit, input, output, working memory, and permanent memory. The central processing unit may be a microprocessor, microcontroller, digital signal processor, or other suitable device. The input may include a keyboard, mouse, joystick, or other suitable device. The output may be a display, indicator, or similar device. The working memory may be dynamic random access memory (DRAM) or other suitable memory. Finally, the permanent memory may be flash memory, a magnetic hard drive, an optical drive, or other suitable permanent memory. The digital computing device may comprise other components as well, such as batteries, power supplies, and so forth.

Examples of a suitable digital computing device may be a desktop personal computer, a laptop personal computer, a personal digital assistant, a cellular phone, or a smart phone. The desktop and laptop personal computers may be commercially available products and may offer a version of the Windows operating system from Microsoft or a version of the MacOS operating system from Apple Computer. The smart phone may be iPhone from Apple Computer or a Blackberry from Research in Motion (RIM). Other suitable digital computing devices may be used as well.

Figure 3:
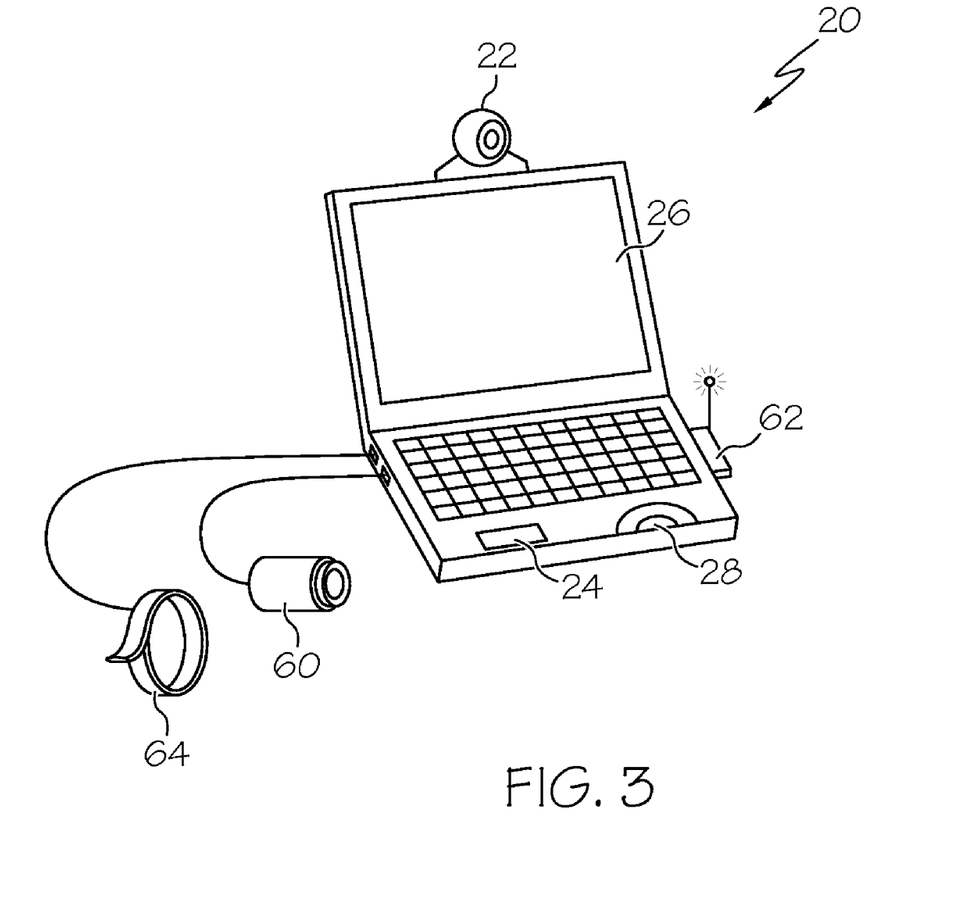
FIG. 3 depicts an interface unit for remotely communicating with a patient according to one or more embodiments shown and described herein.

As shown in FIG. 3, the first interface unit may also comprise a high-resolution camera 60. Although FIG. 3 only shows the first interface unit 20 comprising the high-resolution camera 60, it is to be understood that the second interface unit or additional interface units may also comprise a high-resolution camera 60 as well. The high-resolution camera 60 may supplement the camera 22 (previously discussed herein) and may permit very close-up and/or detailed images to be transmitted from the first interface unit to the other interface unit. For example, the patient may be disposed at the first interface unit 20 comprising a high-resolution camera 60 which is operable to capture high-resolution images of a wound the patient may have. The high-resolution camera 60 may be mounted to the first interface unit 20, or it may be detached from it. The high-resolution camera 60 may transmit images to the first interface unit 20 through a wired or a wireless interface. As an example, the high-resolution camera 60 may be connected to the interface unit through a USB connection. Other suitable connections may be used as well. Images generated by the high-resolution camera 60 may be transmitted to the first interface unit 20, which may subsequently transmit the images to the other interface unit via the communication link 30.

As shown in FIG. 3, the first interface unit may also comprise a location detector 62. Although FIG. 3 only shows the first interface unit 20 comprising the location detector 62, it is to be understood that the second interface unit or additional interface units may also comprise a location detector 62 as well. The location detector 62 may be operable to measure the location of the first interface unit 20. For example, the location detector 62 may measure the location of the first interface unit 20 within a hospital building or an assisted care facility. The location detector 62 may be operable to determine at which rooms and/or which floors the first interface unit 20 is located. The location detector 62 may be mechanically coupled to the first interface unit 20 and may transmit location updates to the first interface unit 20 through a wired or a wireless interface. As an example, the location detector 62 may be connected to the first interface unit 20 through a USB connection. Other suitable connections may be used as well. Location updates may be transmitted to the first interface unit 20, which may store the location updates as a function of time and may subsequently transmit the location history of the location detector 62 to the other interface units via the communication link 30. Thus, if the first interface unit 20 is associated with a single patient, the location detector 62 may operate to track the location of that patient throughout a day or a week. Such information may help determine whether that patient has adhered to his daily schedule or determine whether that patient has visited a location deemed "off limits." Other uses of the location history and/or the current location are possible as well.

The location detector 62 may be based on any suitable technology such as, for example, active radio frequency identification (RFID), wireless local area network, cellular networks, and so forth. For example, the location detector 62 may be an RFID tag which is installed in the first or second interface unit. RFID readers may be installed in various locations in the building such that they are able to track the location of the RFID tag as it moves within the building. In an alternative embodiment, the first or second interface unit may employ the IEEE 802.11 (Wi-Fi) to permit it to connect to the Internet (as part of the communication link 30). In this example, the location detector 62 may be able to determine its location in a building by determining to which wireless access points it is connected. Other similar techniques for determining the location of the first or second interface unit may be used as well.

As shown in FIG. 3, the first interface unit may also comprise a sensor 64. Although FIG. 3 only shows the first interface unit 20 comprising the sensor 64, it is to be understood that the second interface unit or additional interface units may also comprise a sensor 64 as well. The sensor 64 may be operable to detect at least one condition of the patient. The first interface unit 20 (to which the sensor is coupled) may be operable to transmit information corresponding to the at least one condition of the patient to the display of the other interface units. For example, the sensor 64 may be a blood glucose monitor which is operable to detect the condition of the patient's blood glucose level, which may subsequently be transferred to the display of another interface unit. As another example, the sensor 64 may be a heart rate detector which is operable to detect the heart rate of the patient, which may subsequently be transferred to the display of another interface unit. Many other types of sensors may be used as well, including but not limited to blood pressure sensors, oxygen sensors, electrocardiograph sensors, and so forth.

Returning to FIG. 1, the system 10A may permit operating characteristics of the camera and/or the microphone of one interface unit to be controlled by the other interface unit. For example, referring again to FIG. 1, the health care provider 12 may be disposed at the first interface unit 20, while the patient 14 may be disposed at the second interface unit 40. The system 10A may permit the health care provider 12 to control operating characteristics of the camera 42 and/or the microphone 44 of the patient's interface unit (i.e., the second interface unit). In this fashion, the health care provider 12 may move, focus, or zoom the camera 42 as well as adjusting the sensitivity of the microphone 44. This may help the health care provider 12 better see and hear the patient 14 who may be unable to manipulate these operating characteristics on his/her own. In a similar fashion, the health care provider 12 may be able to manipulate the high-resolution camera 60, sensor 64, and any other devices coupled to the patient's interface unit.

The system 10A of FIG. 1 may further comprise at least one additional interface unit connectable to the communication link. The communication link may be operable to transmit real-time video and audio between the first or second interface unit and the additional interface unit. The additional interface unit may comprise a camera, a microphone, a display, and a speaker such that the communication link is operable to transmit real-time video from the camera of the additional interface unit to the display of the first or second interface unit, the communication link is operable to transmit real-time audio from the microphone of the additional interface unit to the speaker of the first or second interface unit, the communication link is operable to transmit real-time video from the camera of first or second interface unit to the display of the additional interface unit, and the communication link is operable to transmit real-time audio from the microphone of the first or second interface unit to the speaker of the additional interface unit. Thus, the system may permit the health care provider 12, when disposed at the first or second interface unit, and the patient 14, when disposed at the additional interface unit, to remotely communicate information corresponding to the patient's medical condition with each other, both visually and audibly, via the communication link in real time.

The additional interface unit or units may permit the health care provider 12 to communicate to a plurality of patients, either simultaneously or one at a time. For example, the health care provider 12 may be disposed at the first interface unit 20, a patient 14 may be disposed at the second interface unit 40, and additional patients may be disposed at the additional interface units such that one or more patients are disposed at each of the additional interface units. In this example, the first interface unit 20 may be called a "master unit," and the second interface unit 40 and additional interface units may called a "satellite units," such that the health care provider may communicate with patients at any one or all of the satellite units. In another example, the first interface unit 20, second interface unit 40, and additional interface units may be essentially equal (e.g., in features and communication priority) such that the health care provider and patient may be disposed at any of these interface units and remotely communicate information corresponding to the patient's medical condition with each other, both visually and audibly, via the communication link in real time.

Figure 2A:
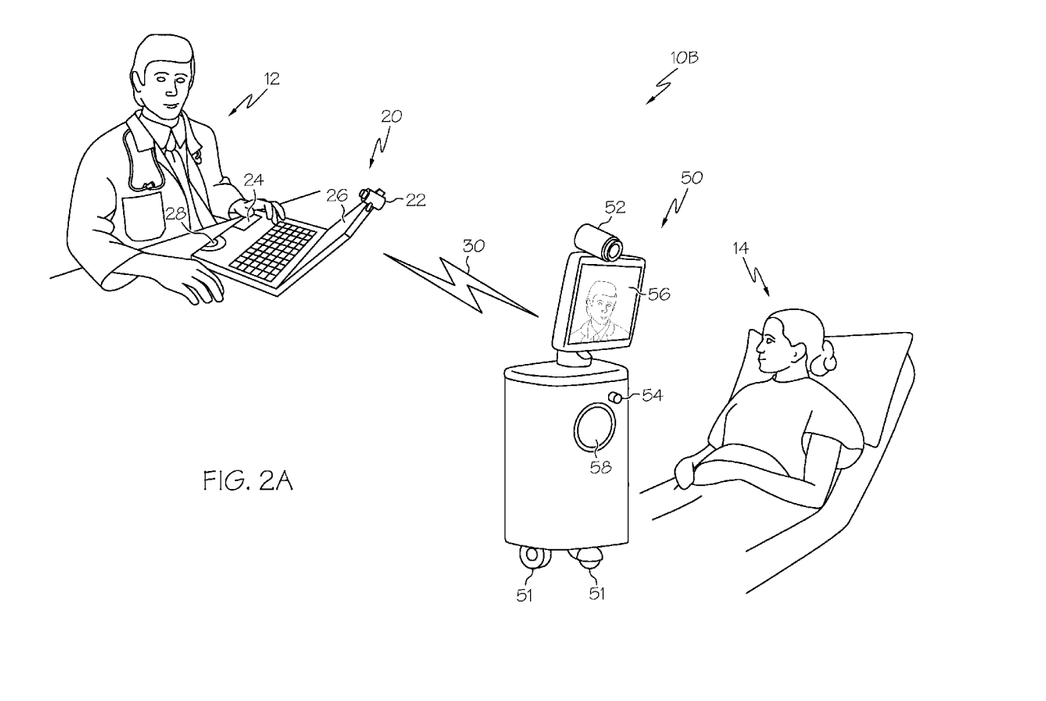
FIG. 2A depicts a system for remotely communicating with a patient according to one or more embodiments shown and described herein.

FIG. 2A depicts another embodiment of the system 10B for remote communication between a health care provider and a patient. In this system 10B, the first interface unit 20 may be a desktop personal computer, a laptop personal computer (as shown in FIG. 2A), a personal digital assistant, a cellular phone, or a smart phone. The second interface unit may be a robot 50 operable to autonomously move, for example, around the floor of a hospital or an assisted care facility. Like the second interface unit, the robot 50 may comprise a camera 52, a microphone, 54, a display 56, and a speaker 58. Additionally, the robot 50 may comprise one or more rollers 51 used in conjunction with a motor (not shown) to give the robot 50 autonomous (self-propelled) features in order to facilitate movement of the robot 50. The rollers 51 may be wheels, balls, or other suitable devices. The robot 50 may comprise a number of other components as well (not shown) such as a battery, drive actuators, proximity sensors, and so forth.

The communication link 30 may be operable to transmit real-time video from the camera 22 of the first interface unit 20 to the display 56 of the robot 50. The communication link 30 may also be operable to transmit real-time audio from the microphone 24 of the first interface unit 20 to the speaker 58 of the robot 50. Likewise, the communication link 30 may be operable to transmit real-time video from the camera 52 of the robot 50 to the display 26 of the first interface unit 20. The communication link 30 may also be operable to transmit real-time audio from the microphone 54 of the robot 50 to the speaker 28 of the first interface unit 20. In this fashion, the system 10B permits the health care provider 12, when disposed at the first interface unit 20 (as depicted in FIG. 2A), and the patient 14, when disposed at the robot 50 (as depicted in FIG. 2A), to remotely communicate information corresponding to the patient's medical condition with each other, both visually and audibly, via the communication link in real time.

Figure 2B:
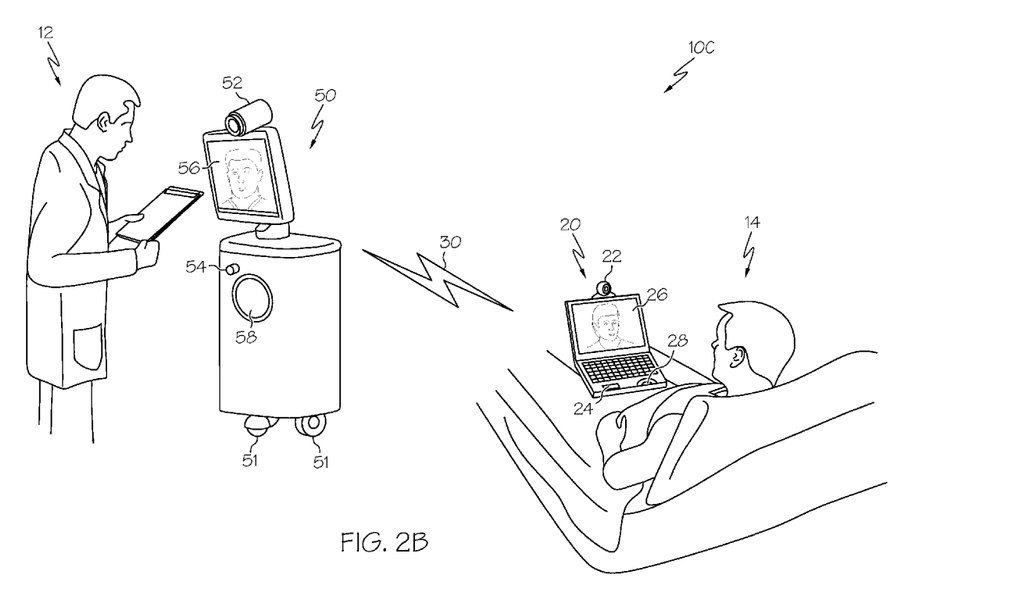
FIG. 2B depicts a system for remotely communicating with a patient according to one or more embodiments shown and described herein.

FIG. 2B shows yet another embodiment similar to that of FIG. 2A. However, in the embodiment of FIG. 2B, the system 10C permits the health care provider 12, when disposed at the robot 50 (as depicted in FIG. 2B), and the patient 14, when disposed at the first interface unit 20 (as depicted in FIG. 2B), to remotely communicate information corresponding to the patient's medical condition with each other, both visually and audibly, via the communication link in real time.

The systems of FIGS. 2A and 2B may be combined into a single remote robotic system comprising a first operating mode and a second operating mode. When configured to operate in the first operating mode (as shown in FIG. 2A), the single system may permit the health care provider 12, when disposed at the first interface unit 20, and the patient 14, when disposed at the robot 50, to remotely communicate information corresponding to the patient's medical condition with each other, both visually and audibly, via the communication link in real time. When configured to operate in the second operating mode (as shown in FIG. 2B), the single system may permit the health care provider 12, when disposed at the robot 50, and the patient 14, when disposed at the first interface unit 20, to remotely communicate information corresponding to the patient's medical condition with each other, both visually and audibly, via the communication link in real time. In this single system, either operating mode may be selected. This may allow multiple uses of such robotic systems.

In the remote robotic system described above, the first interface unit 20 may be operable to control movement of the robot 50 via the communication link 30. Such control may be accomplished through a keyboard, joystick, or similar device coupled to the first interface unit 20. As an example, a joystick may be coupled to the first interface unit 20 which may permit the health care provider to control movement of the robot 50 such that the health care provider 12 can maneuver the robot 50 to one or more patients. This may permit the health care provider 12, as shown in FIG. 2A, to move the robot to the patient and permit the health care provider 12 and the patient 14 to remotely communicate information corresponding to the patient's medical condition with each other, both visually and audibly, via the communication link.

As an example, the health care provider 12 may maneuver the robot 50 to a patient in one room of a hospital, so that they may communicate with each other. The health care provider may then maneuver the robot 50 to a different patient in another room of the hospital, so that the health care provider and the different patient may communicate with each other. In this fashion, the health care provider may communicate with many patients, all or some of whom may be in different locations, while remaining disposed at the first interface unit 20.

The remote robotic system described above may further comprise at least one additional interface unit connectable to the communication link. The communication link may operable to transmit real-time video and audio between the robot or the first interface unit and the at least one additional interface unit. The additional interface units each may comprise a camera, a microphone, a display, and a speaker such that the communication link is operable to transmit real-time video from the camera of an additional interface unit to the display of the robot or first interface unit, the communication link is operable to transmit real-time audio from the microphone of one of an additional interface unit to the speaker of the robot or first interface unit, the communication link is operable to transmit real-time video from the camera of robot or first interface unit to the display of an additional interface unit, and the communication link is operable to transmit real-time audio from the microphone of the robot or first interface unit to the speaker of an additional interface unit. The remote robotic system may permit the health care provider, when disposed at the robot or first interface unit, and the patient, when disposed at the at an additional interface unit, to remotely communicate information corresponding to the patient's medical condition with each other, both visually and audibly, via the communication link in real time. This may permit, in one embodiment, a single health care provider to remotely communicate with two or more patients. In another embodiment, the additional interface unit may permit two or more health care providers to communicate with a single patient. Likewise, additional interface units may allow two or more doctors to communicate with two or more patients.

For example, U.S. Pat. No. 7,218,992 provides a detailed description of one remote robotic system which is usable in the practice of embodiments of this invention. The remote robot includes a remotely-controlled station (e.g., a first interface unit) which may include a personal computer with a monitor, camera, microphone, speaker, and broadband connection capability. However, rather than transporting the remote robot to a remote location or to maneuver the remote robot through a hospital environment to monitor patients in a centrally-located building or campus, one can utilize an existing remote robotic system based in a hospital to instead monitor patients in their homes.

In one embodiment, this is accomplished by equipping nurses or other home health care providers with additional interface units (e.g., portable laptop computers) equipped with cameras, microphones, and wired or wireless Internet communications capabilities. When the nurse arrives at the home of a patient, the additional interface unit is connected, via the communication link, to the centrally-located remote robotic system, such as in a hospital, where health care providers (e.g., senior nurses, supervisory personnel, and/or doctors, including specialists) are present. The centrally-located personnel interact with the patient and home health care provider through the additional interface unit.

In another embodiment, the patient 14 may be provided with or supply his own computer that is equipped with a camera, microphone, and a wired or wireless Internet connection. For example, patients may be pre-assigned appointment times on a daily, weekly, or other basis and can connect with appropriate hospital personnel who can then view and interact with the patient and any vital signs monitors associated with the patient.

The communication link 30, as shown in FIGS. 1, 2A, and 2B may comprise a number of wired and/or wireless networks. Examples of wired networks include but are not limited to Ethernet, Firewire, and USB. Examples of wireless networks include but are not limited to IEEE 802.11, Bluetooth, and the third generation cellular network (3G). The communication link 30 may also comprise a combination of wired and/or wireless networks. A portion of the communication link 30 may also comprise the Internet. Furthermore, encryption technology may be used to safeguard privacy information, such as patient medical information.

For example, the first interface unit may be a robot which may autonomously move within a hospital or other building and may wirelessly communicate to a wireless router via the IEEE 802.11g protocol. The wireless router may be connected to the internet via an Ethernet interface. Continuing with this example, the second interface unit may be a personal computer and may be connected to a wired router via an Ethernet interface. The wired router, in turn, may be connected to the Internet. In this example, the communication link 30 comprises a wireless IEEE 802.11g network, two Ethernet networks, and the Internet which permits the robot (first interface unit) and the personal computer (second interface unit) to remotely communicate information corresponding to the patient's medical condition with each other, both visually and audibly, via the communication link in real time.

It is contemplated that the communication link 30 may comprise a wide variety of different sub-networks and may also assume a number of suitable topologies. The communication link 30 may also comprise a single wired or wireless network as well. For example, it may comprise a single wired network (e.g., Ethernet) such that the first interface unit and the second interface unit communicate directly with each other via the single wired network. Similarly, the communication link 30 may comprise a single wireless network (e.g., a proprietary radio frequency (RF) network) such that the first interface unit and the second interface unit communicate directly with each other via the single wireless network. Other technologies may be used as well, such as infrared.

As discussed herein, the communication link 30 may transmit real-time video and audio between the health care provider and the patient. If the communication link 30 comprises the Internet, the link may use the real-time transport protocol (RTP) in order to deliver the video and audio over the Internet. For example, RTP may comprise the RFC-3550 standard published by the Internet Engineering Task Force (IETF). Other protocols and standards may be used as well. Also as discussed herein, the communication link 30 may transmit control information as well. As an example, FIG. 2A depicts a health care provider 12 at a first interface unit and a patient 14 at a robot 50. The health care provider may control movement of the robot 50 via the communication link 30 such that the health care provider may move the robot 50 from patient to patient.

Although the communication link 30, as discussed herein, comprises a single link (although possibly having multiple stages) between the first and second interface units, the communication link 30 may also comprise two or more parallel links. For example, the communication link 30 may comprise the Internet and a parallel proprietary link. In one embodiment, the proprietary link may normally transmit all of the video, audio, and control signals, while the Internet may be used as a back-up system if the proprietary link malfunctions. In another embodiment, the proprietary link and Internet may share communication tasks. As an example, the Internet may transmit the video and audio, while the proprietary link may simultaneously transmit the control signals. In other words, it is contemplated that the communication link 30 may comprise a number of proprietary and/or public networks.

Methods for remote communication between a health care provider and a patient, such as in the system of FIG. 1, 2A, or 2B are also disclosed. One exemplary method may correspond to the system 10A of FIG. 1 and may comprise establishing a communication link between a first interface unit and a second interface unit, wherein the first and second interface units each comprise a camera, a microphone, a display, and a speaker such that, upon establishment, the communication link transmits real-time video from the camera of one of first and second interface units to the display of the other of the first and second interface units, and the communication link transmits real-time audio from the microphone of one of the first and second interface units to the speaker of the other of the first and second interface units. The method may further comprise disposing one of the first and second interface units at the health care provider and disposing the other of the first and second interface units at the patient. The method also may comprise communicating information corresponding to the patient's medical condition, both visually and audibly, between the health care provider and the patient via the communication link in real time. The acts comprising the aforementioned methods may be performed in any suitable order.

Another exemplary method may correspond to the systems 10B, 10C of FIGS. 2A and 2B and may comprise establishing a communication link between a robot and an interface unit, wherein the robot and interface unit each comprise a camera, a microphone, a display, and a speaker such that, upon establishment, the communication link transmits real-time video from the camera of one of the robot and the interface unit to the display of the other of the robot and interface unit, and the communication link transmits real-time audio from the microphone of one of the robot and interface unit to the speaker of the other of the robot and interface unit. The method may further comprise determining whether to operate in a first operating mode or a second operating mode. When operating in the first operating mode, the method may comprise moving the robot to the patient and disposing the health care provider at the interface unit. When operating in the second operating mode, the method may comprise disposing the patient at the robot and disposing the health care provider at the interface unit. The method may also comprise communicating information corresponding to the patient's medical condition, both visually and audibly, between the health care provider and the patient via the communication link in real time. The acts comprising the aforementioned methods may be performed in any suitable order.

It should now be understood that the systems and methods described herein may permit a health care provider and a patient to remotely communicate information corresponding to the patient's medical condition with each other, both visually and audibly, via the communication link in real time.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A system for remote communication between a health care provider and a patient, the system comprising a first interface unit comprising at least one of desktop personal computer, a laptop personal computer, a personal digital assistant, a cellular phone, or a smart phone, the first interface unit connectable to a communication link, and a second interface unit comprising a robot operable to autonomously move, the second interface unit connectable to the communication link, wherein:
   the communication link is operable to transmit real-time video and audio between the first and second interface units; and
   the first and second interface units each further comprise a camera, a microphone, a display, and a speaker such that upon the transmission of real-time video from the camera of one of the first and second interface units to the display of the other of the first and second interface units, and the transmission of real-time audio from the microphone of one of the first and second interface units to the speaker of the other of the first and second interface units, real-time remote visual and audio communication is established between the health care provider disposed at the second interface unit, and the patient, when disposed at the first interface unit.

2. The system of claim 1, wherein at least one of the first and second interface units is a digital computing device comprising a central processing unit, input, output, working memory, and permanent memory.

3. The system of claim 1, wherein one of the first and second interface units further comprises a high-resolution camera and is operable to transmit images generated by the high-resolution camera to the display of the other of the first and second interface units via the communication link.

4. The system of claim 1, wherein one of the first and second interface units further comprises a location detector and is operable to transmit a location history generated by the location detector to the display of the other of the first and second interface units via the communication link.

5. The system of claim 1, wherein operating characteristics of the camera and microphone of at least one of the first and second interface units are controllable from the other of the first and second interface units via the communication link.

6. The system of claim 1, wherein at least one of the first and second interface units further comprises at least one sensor operable to detect at least one condition of the patient such that information corresponding to the at least one condition can be transmitted to the display of the other of the first and second interface units.

7. The system of claim 1 further comprising at least one additional interface unit connectable to the communication link, wherein
   the communication link is operable to transmit real-time video and audio between the first or second interface unit and the at least one additional interface unit;
   the at least one additional interface unit comprises a camera, a microphone, a display, and a speaker such that the communication link is operable to transmit real-time video from the camera of the at least one additional interface unit to the display of the first or second interface unit, the communication link is operable to transmit real-time audio from the microphone of the at least one additional interface unit to the speaker of the first or second interface unit, the communication link is operable to transmit real-time video from the camera of first or second interface unit to the display of the at least one additional interface unit, and the communication link is operable to transmit real-time audio from the microphone of the first or second interface unit to the speaker of the at least one additional interface unit; and
   the system permits the health care provider to remotely communicate information corresponding to the patient's medical condition with each other, both visually and audibly, via the communication link in real time.

8. The system of claim 1 further operable to permit a health care teacher, when disposed at one of the first and second interface units, and one or more students, when disposed at the other of the first and second interface units, to remotely communicate educational information with each other, both visually and audibly, via the communication link in real time.

9. The system of claim 1, wherein the communication link comprises the Internet.

10. The system of claim 1, wherein the first interface unit is operable to control movement of the second interface unit via the communication link, such that the system permits the health care provider, when disposed at the first interface unit, to move the second interface unit to the patient and remotely communicate information corresponding to the patient's medical condition with each other, both visually and audibly, via the communication link.

11. The system of claim 1, further comprising at least one additional interface unit connectable to the communication link, wherein
   the communication link is operable to transmit real-time video and audio between the second interface unit or the first interface unit and the at least one additional interface unit;
   the at least one additional interface unit comprises a camera, a microphone, a display, and a speaker such that the communication link is operable to transmit real-time video from the camera of the at least one additional interface unit to the display of the second interface unit or first interface unit, the communication link is operable to transmit real-time audio from the microphone of one of the at least one additional interface unit to the speaker of the second interface unit or first interface unit, the communication link is operable to transmit real-time video from the camera of the second interface unit or first interface unit to the display of the at least one additional interface unit, and the communication link is operable to transmit real-time audio from the microphone of the second interface unit or first interface unit to the speaker of the at least one additional interface unit; and the system permits the health care provider to remotely communicate information corresponding to the patient's medical condition with each other, both visually and audibly, via the communication link in real time.

12. The system of claim 1, further comprising a first operating mode and a second operating mode, wherein:

when operating in the first operating mode, the system permits the health care provider, when disposed at the first interface unit, and the patient, when disposed at the second interface unit, to remotely communicate information corresponding to the patient's medical condition with each other, both visually and audibly, via the communication link; and when operating in the second operating mode, the system permits the health care provider to remotely communicate information corresponding to the patient's medical condition with each other, both visually and audibly, via the communication link.

13. A method for remote communication between a health care provider and a patient, the method comprising:

establishing a communication link between a first interface unit and a second interface unit, wherein the first and second interface units each comprise a camera, a microphone, a display, and a speaker such that, upon establishment of the communication link, real-time video from the camera of one of first and second interface units is transmitted to the display of the other of the first and second interface units, and real-time audio from the microphone of one of the first and second interface units is transmitted to the speaker of the other of the first and second interface units;

disposing the second interface unit at the health care provider, the second interface unit comprising a robot;

disposing the first interface unit at the patient;

communicating information corresponding to the patient's medical condition, both visually and audibly, between the health care provider and the patient via the communication link in real time.

14. The method of claim 13 wherein the communicating of video and audio via the communication link is performed over the Internet.

15. A method for remote communication between a health care provider and a patient, the method comprising:

establishing a communication link between a robot and an interface unit, wherein the robot and interface unit each comprise a camera, a microphone, a display, and a speaker such that, upon establishment of the communication link, real-time video from the camera of one of the robot and the interface unit is transmitted to the display of the other of the robot and interface unit, and real-time audio from the microphone of one of the robot and interface unit is transmitted to the speaker of the other of the robot and interface unit; placing the robot adjacent the health care provider;

placing the interface unit adjacent the patient; and communicating information corresponding to the patient's medical condition, both visually and audibly, between the health care provider and the patient via the communication link in real time.

16. The method of claim 15 wherein the communicating of video and audio via the communication link is performed over the Internet.

* * * * *

UNITED STATES PATENT AND TRADEMARK OFFICE
CERTIFICATE OF CORRECTION

| | | |
|---|---|---|
| PATENT NO. | : 8,373,739 B2 | Page 1 of 1 |
| APPLICATION NO. | : 12/574273 | |
| DATED | : February 12, 2013 | |
| INVENTOR(S) | : Debi Sampsel et al. | |

It is certified that error appears in the above-identified patent and that said Letters Patent is hereby corrected as shown below:

In the Specification

Col. 10, Line 41, "FIG. 1, 2A, or 2B" should read --FIGS. 1, 2A, or 2B--.

Signed and Sealed this
Twenty-ninth Day of October, 2013

Teresa Stanek Rea
*Deputy Director of the United States Patent and Trademark Office*